J. A. LÜTHI.
SNAP HOOK.
APPLICATION FILED AUG. 13, 1919.
1,352,982.
Patented Sept. 14, 1920.
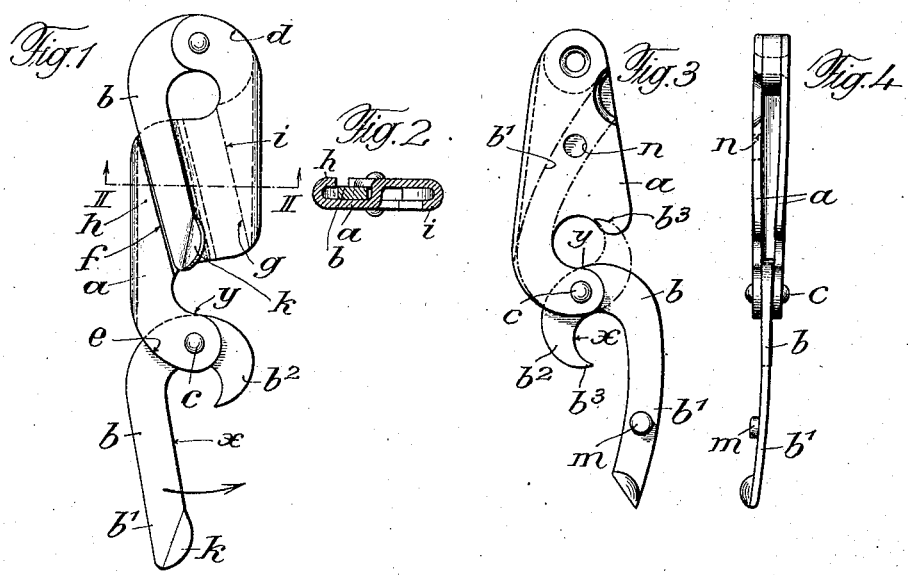
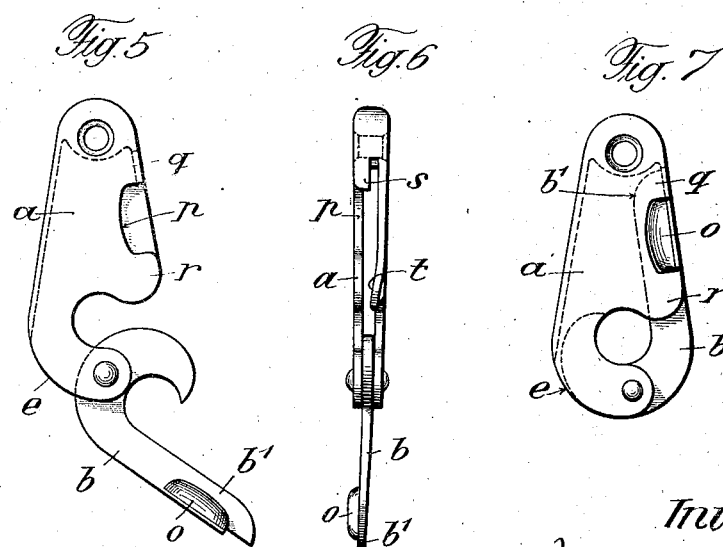
Inventor:
Josef Albert Lüthi,
By Henry Orth Jr.
Atty.

UNITED STATES PATENT OFFICE.

JOSEF ALBERT LÜTHI, OF LACHEN-VONWIL, SWITZERLAND.

SNAP-HOOK.

1,352,982. Specification of Letters Patent. Patented Sept. 14, 1920.

Application filed August 13, 1919. Serial No. 317,309.

*To all whom it may concern:*

Be it known that I, JOSEF ALBERT LÜTHI, a citizen of the Republic of Switzerland, residing at Lachen-Vonwil, Switzerland, have invented certain new and useful Improvements in Snap-Hooks; and I do hereby declare the following to be a clear, full, and exact description of the invention, such as will enable others skilled in the art to which it appertains to make and use the same, reference being had to the accompanying drawing, and to letters or figures of reference marked thereon, which form a part of this specification.

This invention relates to improvements in snap-hooks. There are already known snap-hooks consisting of two members pivotally connected at their lower extremities. One of the members of such hooks has a beveled face and an adjacent shoulder, whereby the two hook members are adapted to automatically interlock, one of the members being composed of spring materials. The member composed of spring material of such hooks is however subjected temporarily or partially to the strain of the load, so that it can not be subjected to a great draft, and said resilient member acting at the same time as a guard member is easily removed from its retaining position when acted upon by the load.

In another kind of snap-hooks hitherto proposed the guard member constitutes a double armed supplemental hook so that the spring catch is normally not subjected to the draft. The spring catch of such hooks comprises however special springs or slides liable to break or to bend when subjected to sudden strains acting by jerks and in a lateral direction, so that the desired safety in working can not be attained.

In order to provide a hook offering the required safety when used for harnessing horses, leashing animals or hoisting heavy loads, the hook according to this invention comprises a guard member having the shape of a double armed lever adapted to act as a combined hauling hook and a retaining spring engaging behind portions of the main body of the hook.

This invention will now be more particularly described with reference to the accompanying drawing illustrating by way of example several modes of carrying out the invention. In this drawing:

Figure 1 is a side view of a first embodiment,

Fig. 2 is a cross-section on the line II—II of Fig. 1;

Fig. 3 is a side view of a second embodiment and

Fig. 4 is a corresponding front view.

Fig. 5 is a side view of a third embodiment,

Fig. 6 being the corresponding front view.

Fig. 7 illustrates the different members of the hook shown in Figs. 5 and 6 in their closed or retaining position.

Referring at first to Figs. 1 and 2, $a$ denotes the main body of the hook having curved ends forming retaining or supporting members $d$ and $e$ and having, when seen in a side view, an S-shaped form. This main body $a$ is provided on its opposite lateral surfaces with two grooves $f$, $g$ and shoulders $h$, $i$, so that a cross-section through the middle of said body has, as shown in Fig. 2, also an S-shaped form. Each of the curved ends $d$ and $e$ respectively of the body $a$ is fork-shaped, these ends being constituted by a tongue-like extension of the bottom of the grooves $f$ and $g$ respectively and a tongue-like extension of the shoulders $h$ and $i$ respectively. Between said extensions is provided on both ends of the body $a$ a double armed lever $b$ which forms an auxiliary retaining member or guard. Each of these levers is pivotally mounted on a bolt $c$ and each of them comprises a longer arm $b^1$ and a shorter arm $b^2$. The shape of the latter is such that it rests in the closed or retaining position of the lever $b$ wholly between the two tongue-shaped portions of the ends $e$ and $d$ respectively. $k$ denotes a bent portion provided at the free end of the arm $b^1$ of the levers $b$ in order to facilitate a turning of the latter.

Let it be now assumed that the described hook is suspended on an eye of a rope passing through the space inclosed by the members $d$ and $b$ when the latter are in their closed position, and that a second eye of the rope has to be seized by the curved end $e$, this second eye reaching from beneath only up to the point $x$ and not up to the supporting point $y$. In such a case, the lever arm $b^1$ is forced through the eye of the rope and by turning this arm $b^1$ the eye of the rope is then hauled until it rests on the point $y$. Hereby the arm $b^1$ which is made of spring material, is moved over the shoulder $i$ and then snaps into the groove $g$, so that the hook is also closed on its lower end.

When the lever arm $b^1$ is moved in the opposite direction to the arrow shown in Fig. 1 out of the groove $g$, the smaller lever arm $b^2$ forces the object that has been brought into the space inclosed by it and the body $a$, for instance the connecting eye of the rope, out of the hook without raising the eye above the point $y$. Under all conditions, the release of the eye from the members $d$ and $e$ may be accomplished without moving the rope longitudinally so that the rope and hook may be separated while under tension without exerting any additional strain or pull on the rope. Preferably, the shorter arm $b^2$ of the lever $b$ is so shaped that its pointed end is not forced into the rope while the latter is forced out of the hook and does not engage any threads of the latter. It is not absolutely necessary to give to the arm $b^2$ a curved shape.

In the embodiment of the invention illustrated in Figs. 3 and 4, the main body $a$ has the shape of a casing having a U-shaped cross-section. In this casing is pivotally mounted in the manner shown in Fig. 4 the double armed lever $b$. When the hook is closed, $i.\ e.$ when the lever $b$ assumes the position illustrated in Fig. 3 in point and dash lines, the longer arm $b^1$ of the lever $b$ rests wholly in the casing $a$ in order to prevent any displacement of said arm $b^1$ when a lateral draft acts upon the hook, while the shorter, curved arm $b^2$ extends only with its pointed end $b^3$ into the casing $a$. In this embodiment of the invention the shorter arm $b^2$ of the lever $b$ is adapted to haul any object, for instance the eye of a rope, from the point $x$ to the point $y$, while the longer arm $b^1$ forces said object out of the hook when the latter is opened. A laterally projecting pin $m$ on the arm $b$ engages into a recess $n$ when the arm $b^1$ of the lever $b$ is moved into the casing $a$, so that said arm $b$ is locked when it snaps into the casing. Instead of the recess $n$ also a through-going hole may be provided on the casing $a$.

In the embodiment of the invention illustrated in Figs. 5 to 7, $a$ denotes again the main body of the hook forming a U-shaped casing and $b$ the double armed lever. The latter is provided near the free end of the arm $b^1$ with a projecting portion $o$ adapted to engage with a recess $p$ provided in the casing $a$. When the members of this hook are in their closed or retaining position (see Fig. 7), the arm $b^1$ lies above and below the recess $p$ at $q$ and $r$ in the casing $a$. Thereby its projecting portion $o$ rests at $r$ on this casing, so that any stretching of the curved ends $e$ is prevented when the strain exerted by the object to be hoisted is very great. Above the recess $p$ is provided at $q$ a lateral shoulder $s$ adapted to act as a stop for the arm $b^1$ when the latter is moved into the casing $a$. In order that the arm $b^1$ may snap in the proper manner behind said shoulder $s$, an oblique portion $t$ (Fig. 6) for instance is provided on the wall lying opposite the shoulder $s$, said portion $t$ constricting the space inclosed between said two walls of the casing $a$. The shorter arm of the lever $b$ is bent in the embodiments of the invention shown to the same extent as the curved end of the body $a$.

In all of these forms of construction it will be noted that the position of the pivot $c$ is below the lowest point of support $y$ of the retaining and supporting semi-hook $e$ so that when a rope or chain is to be released the lever $b$ is moved to releasing position without placing additional tension on the rope or chain, as would be the case if the pivot point $c$ were above the point $y$.

What I claim now as my invention is:

1. A snap hook comprising a casing substantially S-shaped in cross section and having longitudinal grooves in the opposite sides thereof, a resilient double armed lever pivotally mounted at each end of the casing, one arm of each of said levers constituting a hauling hook and the second arm of each lever adapted to engage in the grooves of the casing.

2. A snap hook comprising a casing having grooves formed in its opposite lateral faces, a curved retaining member formed on each end of the casing, a spring metal hook pivoted on each retaining member and having an arm adapted to extend over the casing and snap into the groove therein.

3. A snap-hook comprising a body portion having a semi-hook extension, a hook-shaped hauling lever of spring-metal whose lever arm is normally deflected from its plane of movement, said body portion having a locking shoulder with which said lever is arranged to snap into engagement.

In testimony that I claim the foregoing as my invention, I have signed my name.

JOSEF ALBERT LÜTHI.